3,370,910
PROCESS FOR DYEING POLYPROPYLENE MATERIALS AND MONOAZO DYESTUFFS THEREFOR
Argento Crotti, Cogliate, Milan, and Pietro Albanese, Milan, Italy, assignors to Aziende Colori Nazionali Affini Acna S.p.A., Milan, Italy
No Drawing. Filed Oct. 21, 1964, Ser. No. 405,584
Claims priority, application Italy, Oct. 23, 1963, 21,843/63
15 Claims. (Cl. 8—4)

This invention is directed to a new series of plastosoluble dyestuffs particularly suitable for printing and dyeing synthetic materials including cellulose acetate, artificial silk, polyesters, polyolefins and the like. The olefins include materials comprising polyethylene, polypropylene and the other higher alphaolefin polymers. The dyes of this invention, however, were found to be particularly suitable for use with polypropylene materials.

Recently, the use of isotactic polypropylene has become increasingly important for the production of textile fibers both because of its low cost and for its outstanding chemical and physical characteristics such as, for example, for its resistance to corrosion and chemical agents, insects and micro-organisms, and because of its low density and its high melting point.

This fiber, however, due to its chemical structure is most difficult to dye with dyestuffs presently known. Moreover, it is even more difficult to devise easy and economical dyeing methods with known dyes so as to obtain colored fabrics which are color fast even in dry washing processes. Thus, the dyes presently known are insufficient for providing colored polypropylene fibers with satisfactory general fastnesses.

It has now been discovered, however, in accordance with this invention that a dyestuff characterized by the general formula I may be used satisfactorily without any difficulties. The dyestuffs coming within the scope of this invention are characterized by the formula:

(I) 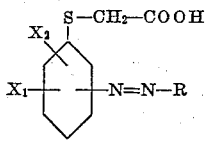

wherein $X_1$ and $X_2$ are either the same or different from each other and are selected from the group consisting of a hydrogen atom, a halogen, $-NO_2$, $-CN$, $-OH$, $-CF_3$, alkyl and alkoxy groups containing from 1 to 18 carbon atoms, NYZ groups wherein Z is an alkyl group having 1 to 6 carbon atoms and Y is a hydrogen atom or the same as Z. The R group is a coupling agent selected from the class consisting of differently substituted phenols, pyrazolones or naphthols. Further, the R group may be selected from the class consisting of an arylamide of beta-oxy-naphthoic acid, dihydroxybenzenes, or if desired substituted alkylphenols or alkylnaphthols, N-alkyl-anilines, N-alkyl-aminonaphthols, and substituted N-alkyl-aminonaphthols, wherein the alkyl groups contain from 1 to 18 carbon atoms.

The dyes characterized by the above formula were found to render intense and brilliant characteristics with good color fastness to the various polymeric films and fibers. Of particular importance is the color fastness with respect to dry washing which includes, for example, the use of trichloroethylene, carbon tetrachloride and various other cleaning solutions. This dry washing color fastness makes the dyestuffs of this invention particularly important because of the widespread use of the various cleaning fluids.

It has further been discovered that the dyestuffs of this invention may be applied on modified or metallized polypropylene fibers so as to obtain fabrics which are generally color fast. Of particular interest was also the discovery that the dyestuffs were resistant to sublimation and they had a color fastness with respect to dry washing solvents as good as that obtained from the non-modified polypropylene materials.

Accordingly, it is an object of this invention to provide a series of plastosoluble dyestuffs particularly suitable for dyeing and printing on synthetic materials including polyolefins and the like.

It is another object of this invention to provide a process preparing a series of plastosoluble dyestuffs which can be used for dyeing and printing on synthetic materials.

It is still another object of this invention to provide a process for dyeing synthetic materials and more particularly polyolefin materials with dyestuffs which are resistant to sublimation and are color fast.

The dyestuffs of this invention are prepared by reacting a specifically selected diazo-derivative of an amino-phenyl-mercapto acetic acid in an aqueous solution or suspension and in the presence of a basic salt with the desired coupling agent. The basic salts present during the reaction of the diazo-derivative have a buffering action and include the alkali metal salts such as sodium acetate or sodium bicarbonate. Before the coupling agent, identified by the R group in the formula hereinabove, is reacted with the diazo-derivative of the amino-phenyl-mercapto acetic acid, it is dissolved in water or some other suitable solvent.

The dyes of this invention may be applied to the synthetic materials such as polypropylene directly from an aqueous dispersion at normal pressures and at temperatures ranging from about 95–100° C. for a period of time ranging from about 30–90 minutes. Alternatively, the dyestuffs can be applied under pressure at temperatures of 105–130° C. and more preferably at temperatures of 110–125° C. for a period of time ranging from about 30–90 minutes. Subsequently, the dyed materials are soaped at about 80° C. for about 30 minutes with a soap solution containing about 5 g. of soap per liter or with a diluted solution of a detergent such as, for example, Dispersol E characterized by the formula

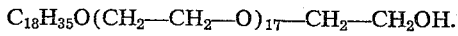

If desirable the dyeing may be carried out in the presence of an additive which is effective in providing stable dispersion and which does not have a retarding action on the dye. In those cases where a very concentrated dye solution is required, the dyed material can be subjected to a mild treatment with a dilute alkaline solution of a hydrosulphide so as to remove the dyestuffs which have not penetrated and still remain on the surface. Still another variation of a dyeing process which may be used with the dyes of this invention comprise applying the dyestuffs by padding-impregnation in the presence of additives which develop at 120° C, in a few minutes. Here the dyestuffs are applied from a bath containing about 0.1–5% of an organic or inorganic substance such as, for example, formic acid, acetic acid, sulphuric acid, etc. The results obtained from the standpoint of shade, intensity of dyeing, fastness, etc., will vary according to the substituting groups present on the diazo-component and on the coupling agent, but in any case the results are always satisfactory.

The following examples are illustrations of the dyestuffs and their use in accordance with this invention.

Example 1

In a 400 cc. glass, provided with an agitator and a thermometer, the following were introduced:

P-amino-phenyl-mercapto acetic acid, (0.0145 mols)
g-- 2.6
Water _____cc-- 100
Concentrated HCl _____cc-- 10

The mixture was cooled at 0–5° C. and 14.5 cc. of a solution, about 1N of sodium nitrite was added dropwise to the solution until a test with starch iodide paper showed a persistent mark. The solution of the diazo-derivative of the $p$ - amino - phenyl - mercapto acetic acid was then poured into a previously prepared solution consisting of:

1-N-phenyl-3-methyl-5-pyrazole, (0.0184 mols)
g-- 3.2
Water _____cc-- 100
Anhydrous sodium carbonate _____g-- 10

The coupling reaction occurred quickly with the formation of an orange colored precipitate. The product was left under agitation for a few hours, was filtered and washed on the filter with about 100 cc. of water and then dried until a constant weight was obtained. The product was then crystallized from water.

A dyestuff in the form of a yellow-orange powder having the following formula was obtained.

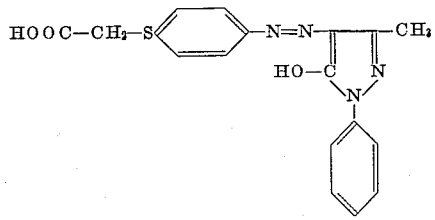

The product dyed polypropylene fibers to a yellow-gold shade showing very good fastness, particularly to dry washing and sublimation.

Example 2

A solution of the diazo-derivative of the p - amino-phenyl - mercapto acetic acid prepared according to Example 1 was poured into a solution consisting of:

Beta-naphthol _____g-- 3
Na₂CO₃ _____g-- 10
Water _____cc-- 100

The coupling reaction occurred quickly and the product, partially soluble, was precipitated by acidification with 10 cc. of concentrate hydrochloric acid. The mixture was filtered and washed until a neutral reaction was obtained. The separated product was dried until constant weight was obtained. After purification with chlorobenzene a dyestuff in form of a red-brown powder, having the following formula was obtained.

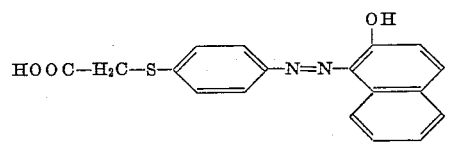

The product dyed polypropylene fibers to a scarlet shade characterized by particularly high fastness to trichloroethylene and sublimation.

Example 3

In a 400 cc. glass provided with agitator and thermometer, the following were introduced:

$p$-amino-phenyl-mercapto acetic acid, (19.7 mols)
g-- 3.6
Water _____cc-- 100
Concentrated HCl _____cc-- 10

The mixture was cooled at 0–5° C. and then treated with 19.7 cc. of a 1-N NaNO₂ solution until a persistent mark was noted on a starch-iodide paper.

A solution of the diazo-derivative of the p - amino-phenyl - mercapto acetic acid was then poured into a previously prepared solution consisting of:

p-sec-butyl-phenyl (20 millimols) _____g-- 3
Alcohol (denatured) _____c-- 100
Sodium carbonate _____g-- 10

The product precipitates at first like pitch and then, after vigorous agitation, a crystalline product was separated by filtration. This product was washed and dried in an air stream for a few hours.

The product was in the form of a brown powder, which after re-crystallization from benzene (1 g./10 cc.) gave a dyestuff in the form of a yellow-orange powder having the following formula:

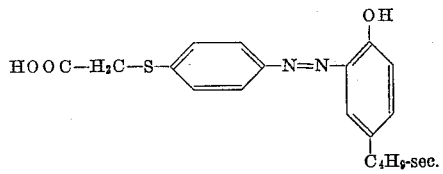

The product dyed polypropylene fibers to a pure yellow shade characterized by very good fastness, particularly high with respect to trichloroethylene and sublimation.

Example 4

About 260 cc. of a 4% solution (48 g./l.) of a sodium salt of 2 - amino - 3 - methyl - 5 - chloro - thioglycolic acid (M.P. 253) (50 millimols) and 60 cc. of a 1-N solution of NaNO₂ were introduced into a 600 cc. glass. The mixture was agitated while cooling at 0–5° C. and was then added to a solution of 50 cc. of concentrated HCl and 100 cc. water in a 600 cc. flask provided with an agitator and thermometer, while keeping the temperature at 0–5° C. by outside cooling. The presence of HNO₂ was controlled by a starch-iodide paper. The product was filtered under vacuum. The filtrate was added to a solution consisting of 11 g. of 1 - phenyl - 3 - methyl-pyrazolone, 30 g. of sodium carbonate and 100 cc. of H₂O.

The product which precipitated was separated by filtration, washed and dried until a constant weight was obtained. A dyestuff having the following formula was obtained:

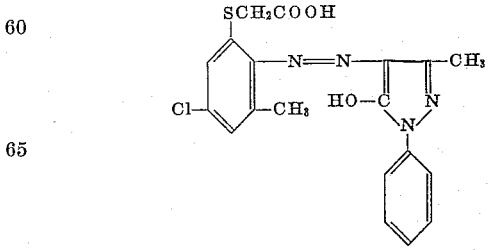

The product was in the form of a yellow-orange powder, which dyed polypropylene to yellow shades characterized by very good fastness, particularly to washing with trichloroethylene and to sublimation.

Example 5

About 260 cc. of a 4% solution (48 g./l.) of the sodium salt of 2 - amino - 3 - methyl - 5 - chloro - thioglycolic acid (M.P. 253) (50 millimols) and 60 cc. of a 1-N solution of sodium nitrite were introduced into a 600 cc. glass.

The mixture was agitated while cooling at 0–5° C. and the solution was then added into a 600 cc. flask provided with an agitator and thermometer and containing 50 cc. concentrated HCl, and 100 cc. H$_2$O, while maintaining the temperature at 0–5° C. by outside cooling. The presence of an excess of HNO$_2$ was detected by means of a starch-iodide paper. The mixture was filtered under vacuum. The filtrate was added to a solution consisting of 10 g. of p-sec.butyl-phenol, and 150 cc. denatured alcohol, while keeping the pH at a value of 8–9 by the addition of sodium carbonate.

The mixture was left for two hours under agitation and then acidified with 20 cc. of concentrated HCl. The product which precipitated was separated by filtration washed until a neutral reaction was obtained and dried until a constant weight was reached. A dyestuff having the following formula was obtained:

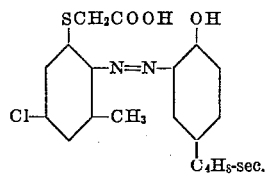

The product was in the form of a yellow-brown powder which dyed polypropylene to a yellow shade. The fastness was very good, particularly with respect to trichloroethylene and to sublimation.

Example 6

About 0.2 g. of the dyestuff prepared according to Example 3 was dissolved in a few cc. of acetone and then the solution was dispersed in 400 cc. water in the presence of a condensation product of ethylene oxide and an aliphatic alcohol having from 15 to 18 carbon atoms in the molecule. About 10 g. of a fabric manufactured from polypropylene fiber was introduced into the dispersion which was brought to the boiling temperature. The fabric was held in the bath, at a temperature of 95–100° C. for about one hour while adding gradually 2 cc. of a 40% solution of formic acid. The dyed material was then washed at 80° C. for half an hour with a soap solution containing 0.5 g. of soap per liter.

The fabric was dyed to a pure yellow shade characterized by very good fastness, particularly with respect to trichloroethylene and to sublimation. By this same process, the dyestuffs prepared according to Examples 1, 2, 4, 5 and 6, or mixtures of two or more of the dyestuffs prepared by the examples can be used for dyeing polypropylene fibers.

While this invention has been described with respect to a number of specific embodiments, it is obvious that there are many other modifications and variations which can be made without departing from the spirit of the invention, within the scope of the appended claims.

What is claimed is:

1. A plastosoluble dyestuff characterized by the general formula

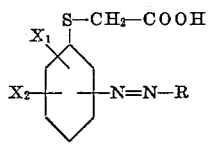

wherein X$_1$ and X$_2$ are either the same or different from one another and are selected from the group consisting of a hydrogen atom, a halogen, —NO$_2$, —CN, —OH, —CF, alkyl groups containing from 1 to 18 carbon atoms, alkoxy groups containing from 1 to 18 carbon atoms, and a NYZ group wherein Z is an alkyl group having from 1 to 6 carbon atoms and Y is either a hydrogen atom or an alkyl group having 1 to 6 carbon atoms and R is a coupling agent selected from the class consisting of phenols, naphthols, pyrazolones, arylamides of beta-oxynaphthoic acid, dihydroxybenzenes, alkylphenols, alkylnaphthols, and N-alkyl-amino-naphthols in which the alkyl group contains from 1 to 18 carbon atoms.

2. The plastosoluble dyestuffs of claim 1 further characterized as having the following structure:

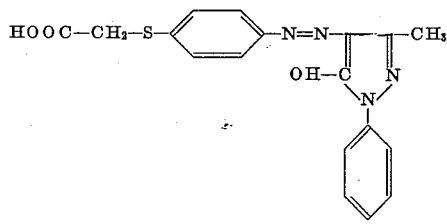

3. The plastosoluble dyestuffs of claim 1 further characterized as having the following structure:

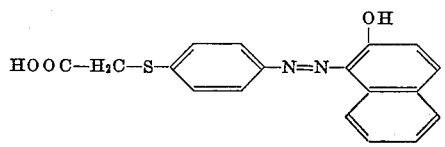

4. The plastosoluble dyestuffs of claim 1 further characterized as having the following structure:

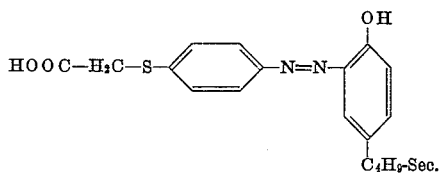

5. The plastosoluble dyestuffs of claim 1 further characterized as having the following structure:

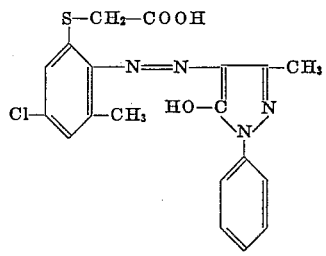

6. The plastosoluble dyestuffs of claim 1 further characterized as having the following structure:

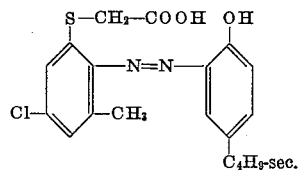

7. A process for preparing the dyestuffs of claim 1 which comprises reacting the diazo-derivatives of the amino-phenol-mercapto acetic acid with the coupling agent in an aqueous medium and in the presence of an alkali metal salt buffering agent; said coupling agent having been previously dissolved in a solvent and being selected from the group consisting of phenols, naphthols, pyrazolones, arylamides of beta-oxy-naphtholic acid, dihydroxybenzenes, alkylphenols, alkylnaphthols, and N-alkyl-amino-naphthols in which the alkyl group contain from 1 to 18 carbon atoms.

8. A process for dyeing polyolefin materials which comprises adding said materials to an aqueous dyebath at a temperature ranging from about 95–105° C. for a period of time ranging from about 30–90 minutes; said aqueous dyebath containing from about 0.1–5% by weight of the bath of an acidic compound and an effective amount of at least one of the dyestuffs of claim 1.

9. The process of claim 8 further characterized in that the acidic compound is an organic compound.

10. The process of claim 8 further characterized in that the acidic compound is an inorganic compound.

11. The process of claim 8 further characterized in that the dyeing of the polyolefin materials is carried out under pressure in an aqueous bath at a temperature ranging from about 105–130° C.

12. The process of claim 8 further characterized in that the acidic compound is selected from the group consisting of formic acid, acetic acid, sulphuric acid, and hydrochloric acid.

13. An aqueous dyebath containing at least one of the dyestuffs of claim 1.

14. Polypropylene shaped articles dyed with the plasto-soluble dyestuffs of claim 1.

15. The polypropylene materials of claim 14 further characterized as being in the form of dyed yarns and fabrics.

References Cited

UNITED STATES PATENTS

| | | | |
|---|---|---|---|
| 2,849,479 | 8/1958 | Carmack et al. | 260—197 X |
| 3,211,718 | 10/1965 | Bikales | 260—197 |
| 3,257,379 | 6/1966 | May et al. | 8—41 X |

J. TRAVIS BROWN, *Primary Examiner.*

NORMAN G. TORCHIN, *Examiner.*

THOMAS J. HERBERT, JR., *Assistant Examiner.*

UNITED STATES PATENT OFFICE
CERTIFICATE OF CORRECTION

Patent No. 3,370,910            February 27, 1968

Argento Crotti et al.

It is certified that error appears in the above identified patent and that said Letters Patent are hereby corrected as shown below:

Column 1, lines 40 to 45, the formula should appear as show below:

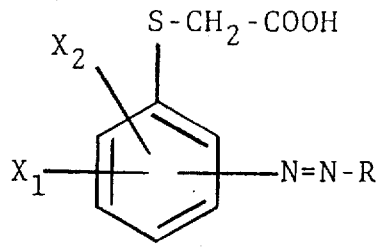

same column 1, line 50, "carbon atoms, NYZ" should read -- carbo atoms, and NYZ --. Column 3, line 8, "P-amino-" should read -- p-amino- --; line 19, "5-pyrazole" should read -- 5-pyrazolone --. Column 4, line 41, and column 5, line 3, after "chloro-", each occurrence, insert -- phenyl- --. Column 5, lines 24 to 31 the formula should appear as shown below:

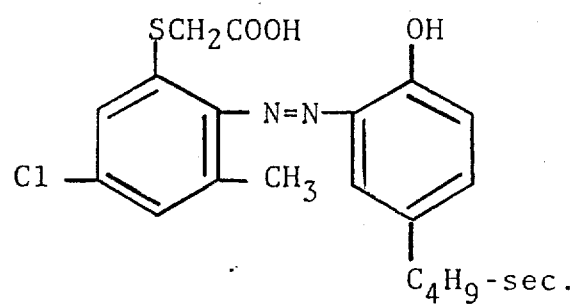

same column 5, lines 65 to 70, the formula should appear as shown below:

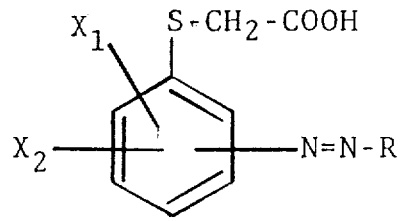

Signed and sealed this 3rd day of  March  1970.

(SEAL)
Attest:

EDWARD M. FLETCHER, JR.
Attesting Officer

WILLIAM E. SCHUYLER, JR.
Commissioner of Patents